United States Patent
Cohen

(10) Patent No.: US 6,624,106 B2
(45) Date of Patent: Sep. 23, 2003

(54) ALUMINA CERAMIC PRODUCTS

(76) Inventor: Michael Cohen, Kibbutz Kfar Etzion, Mobile Post North Yehuda 90200 (IL)

( * ) Notice: Subject to any disclaimer, the term of this patent is extended or adjusted under 35 U.S.C. 154(b) by 143 days.

(21) Appl. No.: 09/841,619

(22) Filed: Apr. 23, 2001

(65) Prior Publication Data

US 2002/0010071 A1 Jan. 24, 2002

(30) Foreign Application Priority Data

May 2, 2000 (IL) ................................. 135936

(51) Int. Cl.⁷ ..................... C04B 35/106; F41H 1/02; F41H 5/00
(52) U.S. Cl. ..................... 501/105; 501/127; 2/2.5; 89/36.02
(58) Field of Search ................... 501/105, 127; 2/2.5; 89/36.02

(56) References Cited

U.S. PATENT DOCUMENTS

| | | | | |
|---|---|---|---|---|
| 4,804,645 A | * | 2/1989 | Ekstrom | 501/105 |
| 5,188,908 A | * | 2/1993 | Nishiyama et al. | 501/87 |
| 5,763,813 A | * | 6/1998 | Cohen et al. | 89/36.02 |
| 5,830,816 A | * | 11/1998 | Burger et al. | 501/105 |
| 6,112,635 A | * | 9/2000 | Cohen | 89/36.02 |
| 6,133,182 A | * | 10/2000 | Sasaki et al. | 501/127 |
| 6,203,908 B1 | * | 3/2001 | Cohen | 428/397 |
| 6,289,781 B1 | * | 9/2001 | Cohen | 89/36.02 |
| 6,408,734 B1 | * | 6/2002 | Cohen | 89/36.02 |

FOREIGN PATENT DOCUMENTS

| | | | |
|---|---|---|---|
| EP | 843149 | * | 5/1998 |
| WO | 99/50612 | * | 10/1999 |

* cited by examiner

Primary Examiner—Karl Group
(74) Attorney, Agent, or Firm—Fulbright & Jaworski L.L.P.

(57) ABSTRACT

The invention provides a sintered, alumina ceramic product comprising about 90–97.5 w/w % $Al_2O_3$, about 0.5–1.0 w/w % MgO, about <0.05–1.0 w/w % $SiO_2$, about 4.5–7.5 w/w % $ZrO_2$ and about 0.07–0.13 w/w % $HfO_2$.

7 Claims, 1 Drawing Sheet

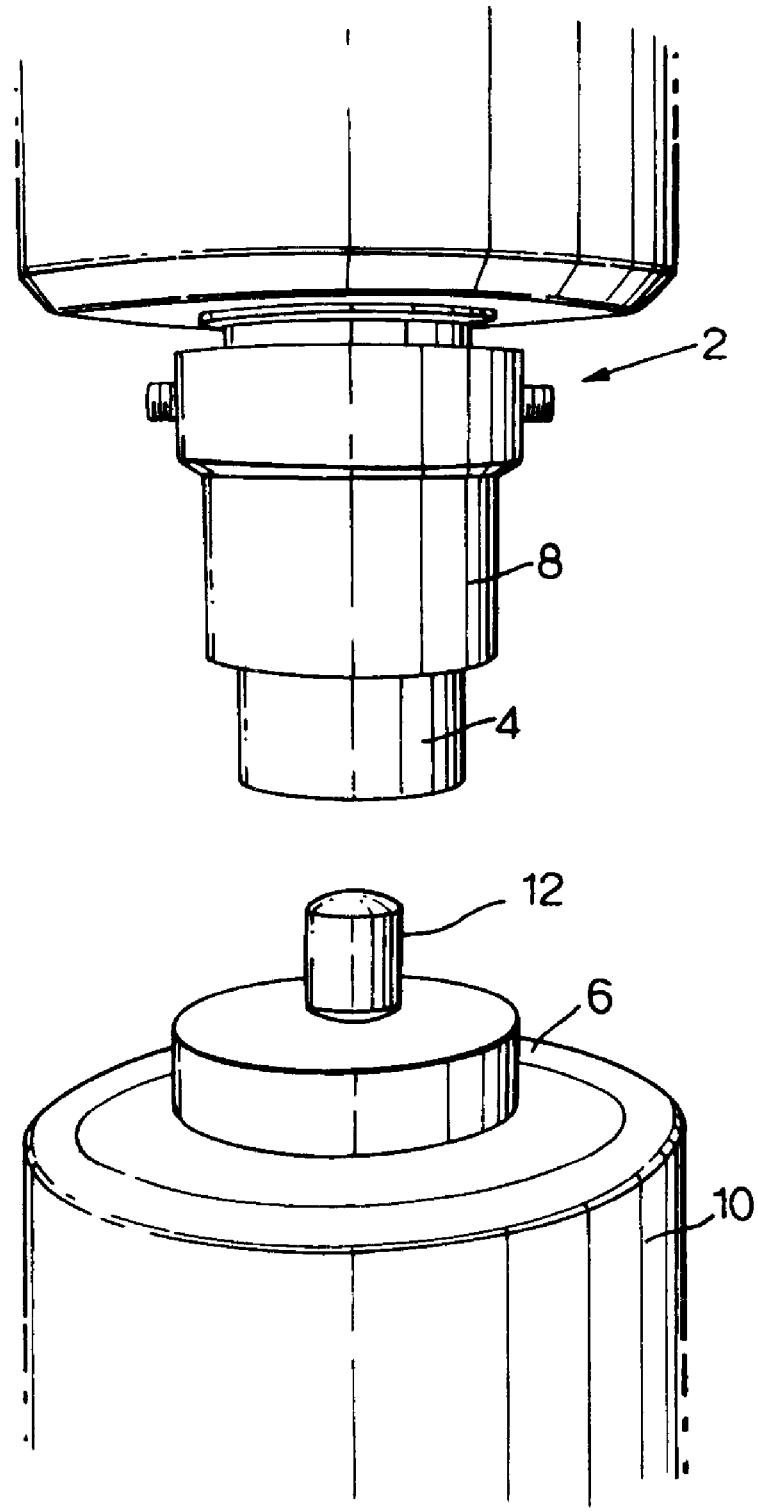

ALUMINA CERAMIC PRODUCTS

The present invention relates to a sintered, alumina ceramic product. More particularly, the present invention relates to a sintered, alumina ceramic product exhibiting a high homogenity of performance between products produced in the same batch.

As is known, the properties of ceramic pieces are in most cases non-uniform, i.e., the value of a property, for example hardness, varies from point to point of a specimen and even more so between different products produced in the same batch.

These variations are due to variations in the density, phase composition, grain size, porosity and internal stress distribution of the products. There are many factors all along the manufacturing process which are responsible for the variation of the characteristics mentioned above. For instance, a component made by pressing and having a complex shape has a non-uniform bulk density after pressing. This is so because the applied pressure is not identical at all points when the shape of the desired product is complex. In many cases these "green" density differences remain also after the sintering of the product.

Another problem contributing to the non-uniformity is the temperature gradients in the furnaces used for sintering. These will cause differences from product to product, or within a given product in the density thereof and, as a consequence, in the properties thereof. Other problems are related to non-uniform mixing of the initial raw materials, e.g., $Al_2O_3$ and the sintering aids.

This also leads to fluctuations in the fired part density. The sintering process itself, even without temperature gradients, is non-uniform also due to the aggregates present in the powder to be sintered. This may cause differences from point to point in the product itself, in the size and numbers of the residual pores which remain after sintering. In other cases rapid cooling may leave stresses which are not evenly distributed. Such stresses also influence properties such as strength.

Thus, e.g., at a conference being organized for Apr. 30–May $3^{rd}$, 2000 at America's Center, St. Louis, Mo., Focused Session 6 is entited: Point Defects, Transport, and other Defect-Related Phenomena in Ceramics", wherein the abstract describing said session states that "Point defects occur in all ceramic materials, at larger defect concentrations to some extent bound in associates and clusters. Point defects are present within the bulk, at and near interfaces, however, not necessarily everywhere in equal concentrations. Many properties of ceramic materials and also processes involving such materials are strongly influenced by point defects. Therefore, detailed experimental and/or theoretical studies of point defects in ceramics and of related phenomena can significantly contribute to improve the current understanding of defect-related properties of ceramics and of many processes involving such materials."

This problem is especially acute when alumina pellets are used in ceramic armor, since non-uniformity of stopping power of adjacent pellets can have adverse effect on the reliability of the armor panel produced therefrom.

With this state of the art in mind, it has now been surprisingly discovered that by combining aluminum oxide with other oxides within specific parameter ratios, there is achieved an exceptional rise in the homogenity of the produced product in terms of parametric tolerance based on crush point studies of geometric bodies produced therefrom after sintering. Thus, it has been found that by using raw materials in which the chemical compositions fall within a specific range and forming them into geometric sintered shapes, homogenity of performance previously unknown in the art and quantitatively and qualitatively superior to that of products presently available on the market is achieved.

Thus, according to the present invention there is now provided a sintered, alumina ceramic product comprising about 90–97.5 w/w % $Al_2O_3$, about 0.5–1.0 w/w % MgO, about <0.05–1.0 w/w % $SiO_2$, about 4.5–7.5 w/w % $ZrO_2$ and about 0.07–0.13 w/w % $HfO_2$.

In preferred embodiments of the present invention there is provided a sintered, alumina ceramic product, comprising at least 0.585 w/w % MgO, 90 w/w % $Al_2O_3$, <0.05 w/w % $SiO_2$, 4.5 w/w % $ZrO_2$ and 0.075 w/w % $HfO_2$.

Preferably the sintered, alumina ceramic products according to the present invention, comprise up to 1.0 w/w % MgO, 97.5 w/w % $Al_2O_3$, 1 w/w % $SiO_2$, 7.5 w/w % $ZrO_2$ and 0.125 w/w % $HfO_2$.

In an especially preferred embodiment of the present invention there is provided a sintered, alumina ceramic product, comprising about 0.6 w/w % MgO, 93 w/w % $Al_2O_3$, <0.05 w/w % $SiO_2$, 6 w/w % $ZrO_2$ and 0.1 w/w % $HfO_2$.

The ceramic products of the present invention can preferably include further minor amounts of additional oxides, selected from the group consisting of $Na_2O$, $P_2O_5$, $K_2O$, CaO, $TiO_2$, $Fe_2O_3$, CuO, ZnO, BaO, $Y_2O_3$ and mixtures thereof.

Thus, in a most preferred embodiment of the present invention there is provided a sintered, alumina ceramic product comprising about 0.6 w/w % MgO, 92.62 w/w % $Al_2O_3$, <0.05 w/w % $SiO_2$, 6 w/w % $ZrO_2$, 0.1 w/w % $HfO_2$, 0.2 w/w % $Na_2O$, 0.02 w/w % $P_2O_5$, 0.01 w/w % $K_2O$, 0.1 w/w % CaO, 0.01 w/w % $TiO_2$, 0.02 w/w % $Fe_2O_3$, 0.2 w/w % CuO, 0.02 w/w % ZnO, 0.5 w/w % BaO, and 0.04 w/w % $Y_2O_3$.

The present invention also provides a ceramic pellet for use in an armor panel, said pellet being made from a sintered, alumina product comprising about 90–97.5 w/w % $Al_2O_3$, about 0.5–1.0 w/w % MgO, about <0.05–1.0 w/w % $SiO_2$, about 4.5–7.5 w/w % $ZrO_2$ and about 0.07–0.13 w/w % $HfO_2$.

In especially preferred embodiments of the present invention there is provided an armor panel comprising a single internal layer of high density ceramic pellets which are directly bound and retained in plate form by a solidified material such that the pellets are arranged in a single layer of adjacent rows and columns wherein a majority of each of said pellets is in direct contact with at least six adjacent pellets, wherein each of said pellets is made from a sintered, alumina product comprising about 90–97.5 w/w % $Al_2O_3$, about 0.5–1.0 w/w % MgO, about <0.05–1.0 w/w % $SiO_2$, about 4.5–7.5 w/w % $ZrO_2$ and about 0.07–0.13 w/w % $HfO_2$ and there is less than a 30% difference between the crushing point of adjacent pellets.

The surprising homogenity and uniformity of the ceramic products according to the present invention enables the use thereof in electrically related applications.

Thus, the present invention also provides a ceramic product, as hereinbefore defined, wherein the bulk resistivity of a plurality of products prepared from the same batch exhibits a standard deviation of less than 0.1.

While the invention will now be described in connection with certain preferred embodiments in the following examples and with reference to the accompanying FIGURE so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

BRIEF DESCRIPTION OF THE DRAWINGS

In the drawings:

The FIGURE is a photograph of a hydraulic press with a cylinder to be tested inserted therein.

EXAMPLE 1

A plurality of ceramic bodies were prepared from $Al_2O_3$ ceramic powder ground to a size of about 180–200 microns and combined in the following ratio of about 0.6 w/w % MgO, 92.62 w/w % $Al_2O_3$, <0.05 w/w % $SiO_2$, 6 w/w % $ZrO_2$, 0.1 w/w % $HfO_2$, 0.2 w/w % $Na_2O$, 0.02 w/w % $P_2O_5$, 0.01 w/w % $K_2O$, 0.1 w/w % CaO, 0.01 w/w % $TiO_2$, 0.02 w/w % $Fe_2O_3$, 0.2 w/w % CuO, 0.02 w/w % ZnO, 0.5 w/w % BaO, and 0.04 w/w % $Y_2O_3$.

The ground powder, after cleaning, is pressed in a suitable mold using special Tungstun Carbide tooling, having a pressure of 70 tons for about two seconds, to form ceramic bodies of different preferred dimensions, all of said bodies being of cylindrical shape with two convexly-curved end faces and having varying heights. The bodies which are formed were then placed in an tray for transfer to a sintering oven. The bodies were then sintered at a temperature of 1,700° C. for seventy-two hours, after which the sintered shapes are removed from the sinter oven and allowed to cool at room temperature.

Comparative Example A

A plurality of ceramic bodies of substantially cylindrical shape and having two convexly-curved end faces were ordered from CoorsTek, Colorado Operations, Golden, Colo., U.S.A. and tested as described hereinafter with reference to Table 2, from Rami Ceramic Industries LTD, Nazareth Illite, Israel and tested as described hereinafter with reference to Tables 3–5 and 7, and from Helmut Kreutz GmbH, Haiger, Germany and tested as described hereinafter and with reference to Tables 5 and 6.

Each of said ceramic bodies were placed in a hydraulic press 2 Model C.E. "Controls" Power Hydraulic Press manufactured in Milan, which is a 500-mm Stroke capable of generating 55 tons of pressure. All testing was done using Tungstun steel inserts 4 and 6 to protect the piston 8 and base plate 10, as illustrated in FIG. 1. All testing was done by loading the cylinders 12 vertically and at 90° to the press plates and applying pressure at a constant rate in "one point" compression, in which pressure is only applied to the extreme top and bottom of the curved surface of the cylinder. The pressure is applied is a standard rate of 0.5 tons increase per second until the one point crushing of the cylinder is accomplished. At this point the amounts of tons required to "crush" the cylinder is automatically recorded via a Digital III load pressure recorder and recorded in the computer.

The results of these tests are presented in the following tables:

TABLE 1

Cylindrical Pellets of Various Sizes According to the Present Invention Tested for "break point" of M-3 Ceramic Cylinders in TONS

| Number | 11.6 mm ht. | 12.1 mm ht. | 12.7 mm ht. |
|---|---|---|---|
| 1 | 6.44 | 6.52 | 6.46 |
| 2 | 6.2 | 7.36 | 6.45 |
| 3 | 7.76 | 6.81 | 7.15 |
| 4 | 6.69 | 6.89 | 7.65 |
| 5 | 7.35 | 7.14 | 7.21 |
| 6 | 6.28 | 7.13 | 7.61 |
| Minimum | 6.2 | 6.52 | 6.45 |
| Maximum | 7.76 | 7.36 | 7.65 |

| Number | 19.4 mm height | Number | 20.5 height |
|---|---|---|---|
| 1 | 17.14 | 1 | 15.94 |
| 2 | 13.99 | 2 | 15.91 |
| 3 | 15.12 | 3 | 17.9 |
| 4 | 13.92 | 4 | 18.05 |
| 5 | 16.55 | 5 | 16.2 |
| 6 | 13.91 | 6 | 15.89 |
| 7 | 15.49 | 7 | 15.9 |
| 8 | 13.15 | 8 | 17.9 |
| 9 | 13.98 | 9 | 17.52 |
| 10 | 13.94 | 10 | 16.6 |
| 11 | 14.29 | 11 | 16.62 |
| 12 | 15.92 | 12 | 16.92 |
| 13 | 14.44 | 13 | 17.5 |
| Minimum | 13.92 | Min | 15.9 |
| Maximum | 17.14 | Max | 18.05 |

TABLE 2

Coors AD-995 Material, Coors FG 995-S2 Material, Coors AD-995 I-2 Material, and Coors FZ-995 Tested for "break point" in TONS

| Number | AD-995 19.4 mm height | FG 995 S2 19.4 mm height | AD-995 I-2 19.4 mm height |
|---|---|---|---|
| 1 | 8.39 | 10.8 | 14.28 |
| 2 | 12.7 | 14.4 | 12.02 |
| 3 | 10.67 | 9.04 | 12.37 |
| 4 | 7.3 | 8.88 | 12.78 |
| 5 | 7.71 | 11.24 | 14.4 |
| 6 | 7.53 | 9.5 | 8.31 |
| 7 | 7.04 | 11.48 | 10.98 |
| 8 | 8.02 | 8.04 | 10.43 |
| 9 | 6.96 | 8.86 | 9.72 |
| 10 | 8.86 | 9.43 | 9.48 |
| Minimum | 6.96 | 8.04 | 8.31 |
| Maximum | 12.7 | 11.48 | 14.4 |

| Number | Coors FZ-995 20.5 ht |
|---|---|
| 1 | 12.7 |
| 2 | 13.43 |
| 3 | 11.55 |
| 4 | 12.89 |
| 5 | 13.64 |
| 6 | 12.09 |
| 7 | 12.8 |
| 8 | 12.3 |
| 9 | 12.29 |
| 10 | 12.48 |
| 11 | 13.58 |
| 12 | 12.46 |
| 13 | 12.62 |
| 14 | 12.58 |
| 15 | 9.52 |
| Minimum | 9.52 |
| Maximum | 13.64 |

TABLE 3

Break load (point) Testing of standard ceramic cylinders produced by Rami Ceramica.

| Number | TEST #1 20.7 mm | TEST #2 12.7 mm | TEST #3 12.7 mm | TEST #4 21.5 mm |
|---|---|---|---|---|
| 1. | 4.92 | 5.3 | 7.15 | 4.92 |
| 2. | 5.13 | 5.3 | 7.15 | 5.13 |
| 3. | 5.19 | 4.33 | 5.8 | 5.19 |
| 4. | 3.32 | 4.33 | 5.8 | 3.32 |
| 5. | 4.45 | 5.52 | 7.4 | 4.85 |
| 6. | 4.2 | 6.14 | 8.1 | 4.29 |
| 7. | 4.7 | 5.075 | 6.8 | 4.7 |
| 8. | 5.7 | 4.89 | 6.5 | 5.7 |
| 9. | 5.91 | 4.63 | 6.2 | 5.91 |
| 10. | 5.44 | 6.09 | 8.1 | 5.44 |
| 11. | 5.41 | 4.81 | 6.4 | 5.41 |
| 12. | 5.62 | 4.48 | 6 | 5.62 |
| 13. | 5.73 | 4.44 | 5.9 | 5.73 |
| 14. | 4 | 3.955 | 5.3 | 4 |
| 15. | 5.67 | 4.18 | 5.6 | 5.67 |
| 16. | 4.95 | 3.93 | 5.3 | 4.65 |
| 17. | 4.74 | 5.57 | 7.3 | 4.74 |
| 18. | 6.13 | 5.56 | 7.5 | 6.13 |
| 19. | 5.46 | 5.63 | 7.6 | 5.46 |
| 20. | 4.915 | 4.2 | 5.5 | 4.915 |
| 21. | 4.94 | 5.93 | 7.83 | 4.94 |
| 22. | 4.94 | 4.86 | 6.56 | 4.5 |
| 23. | 4.5 | 5.44 | 7.34 | 6.905 |
| 24. | 6.905 | 4.785 | 6.46 | 5.42 |
| 25. | 5.42 | 5.79 | 7.82 | 4.44 |
| 26. | 4.44 | 6.345 | 8.44 | 6.08 |
| 27. | 6.08 | 4.92 | 6.5 | 5.415 |
| 28. | 5.415 | 4.89 | 6.5 | 4.98 |
| 29. | 4.98 | 4.74 | 6.4 | 4.83 |
| 30. | 4.83 | 4.9 | 6.42 | 4.94 |
| Min | 3.32 | 3.93 | 5.3 | 3.32 |
| Max | 6.905 | 6.345 | 8.44 | 6.905 |

TABLE 4

Break load (point) Testing of standard ceramic cylinders produced by Rami Ceramica.

| Number | TEST NUMBER 1 15.2 ht. | TEST NUMBER 2 14.5 ht. |
|---|---|---|
| 1. | 88 | 1 |
| 2. | 8.1 | 8.7 |
| 3. | 9.2 | 6.4 |
| 4. | 9.5 | 7.4 |
| 5. | 5.2 | 7.3 |
| 6. | 9.5 | 9.8 |
| 7. | 10 | 7.6 |
| 8. | 10 | 1 |
| 9. | 9.2 | 6.8 |
| 10. | 10 | 9.5 |
| 11. | 8.3 | 8 |
| 12. | 9.5 | 1 |
| 13. | 10 | 9.5 |
| 14. | 8.75 | 1.5 |
| 15. | 10 | 9.2 |
| 16. | 10 | 1.8 |
| 17. | 8.7 | 9.2 |
| 18. | 8.5 | 7.9 |
| 19. | 9.4 | 1 |
| 20. | 10 | 1.5 |
| 21. | 7.3 | 7.8 |
| 22. | 8.5 | 1.9 |
| 23. | 10 | 8.6 |
| 24. | 8.6 | 9 |
| 25. |  | 1.6 |
| Minimum | 7.3 | 1 |
| Maximum | 10 | 9.5 |

TABLE 5

Break load (point) Testing of standard ceramic cylinders produced by Rami Ceramica and Helmut Kreutz GMBH of Germany. Testing done at Helmut Kreutz GMBH Laboratory

| Number | Ramai Ceramica Standard 20.5 ht. | Kreutz KX 97% Alumina 22.69 ht |
|---|---|---|
| 1. | 16.5 | 26.5 |
| 2. | 17.5 | 21 |
| 3. | 19 | 24 |
| 4. | 16.5 | 27.5 |
| 5. | 18 | 25 |
| 6. | 17.5 | 25.5 |
| 7. | 20 | 23.5 |
| 8. | 14.5 | 27 |
| 9. | 17.5 | 18 |
| 10. | 9.5 | 23 |
| 11. | 11.5 | 27 |
| 12. | 17 | 25 |
| 13. | 24 | 24 |
| 14. | 18 | 25 |
| 15. | 19 | 24 |
| 16. | 18 | 27 |
| 17. | 13.5 | 20 |
| 18. | 21.5 | 25 |
| 19. | 18.5 | 26 |
| Min. | 9.5 | 22 |
| Max. | 24 | Min 18 |
|  |  | Max 27.5 |

TABLE 6

Break load (point) Testing of standard ceramic cylinders produced by Helmut Kreutz GMBH of Germany: 97% Alumina and 92% Alumina Testing done at Helmut Kreutz GMBH Laboratory

| Number | Kreutz 97% 22.5 ht | Kreutz 92% 16.3 ht. | Kreutz 92% 22.8 ht |
|---|---|---|---|
| 1 | 20 | 13 | 11 |
| 2 | 23 | 10 | 14 |
| 3 | 20 | 10 | 15 |
| 4 | 21 | 13 | 14 |
| 5 | 26 | 16 | 12 |
| 6 | 12 | 11 | 15 |
| 7 | 17 | 11 | 14 |
| 8 | 27 | 12 | 17 |
| 9 | 21 | 10 | 14 |
| 10 |  | 9 | 12 |
| 11 |  |  | 10 |
| MIN | 12 | 9 | 10 |
| MAX | 27 | 16 | 17 |

TABLE 7

Break load (point) Testing of standard ceramic cylinders produced by Rami Ceramica.
Testing done at the Israel Ceramic and Silicate Institute and Comparison Testing in this height done at Etzion Metals

| Number | M-3 Cylinder According to the Present Invention 14.5 ht. | Rami Ceramics Normal 14.5 ht. |
|---|---|---|
| 1 | 9 | 1 |
| 2 | 9.5 | 8.7 |
| 3 | 10.0 | 6.4 |
| 4 | 10.0 | 7.4 |
| 5 | 9.0 | 7.3 |
| 6 | 9.2 | 9.8 |
| 7 | 9.8 | 7.6 |
| 8 | 9.5 | 1 |
| 9 | 9.0 | 6.8 |
| 10 | 10.1 | 9.5 |

TABLE 7-continued

Break load (point) Testing of standard ceramic cylinders produced by Rami Ceramica.
Testing done at the Israel Ceramic and Silicate Institute and Comparison Testing in this height done at Etzion Metals

| Number | M-3 Cylinder According to the Present Invention 14.5 ht. | Rami Ceramics Normal 14.5 ht. |
|---|---|---|
| 11 | 9.9 | 8 |
| 12 | 9.4 | 1 |
| 13 | 9.3 | 9.5 |
| 14 | 9.5 | 1.5 |
| 15 | 9.5 | 9.2 |
| 16 | 9.5 | 1.8 |
| 17 | 9.5 | 9.2 |
| 18 | 9.2 | 7.9 |
| 19 | 9.6 | 1 |
| 20 | 9.7 | 1.5 |
| 21 | 9.0 | 7.8 |
| 22 | 8.9 | 1.9 |
| 23 | 10.1 | 8.6 |
| 24 | 9 | 9 |
| 25 | 9.4 | 1.6 |
| Minimum | 8.9 | 1 |
| Maximum | 10.1 | 9.5 |

Referring to Table 1, it will be noted that cylindrical pellets, having a height of 19.4 mm and prepared according to the present invention, had break points varying between 13.92 and 17.14 tons, while Table 2 illustrates that similarly sized pellets obtained from CoorsTek, Colorado Operations, Golden, Colo., U.S.A had break points varying between 6.96 and 12.7 tons, 8.04 and 11.48 tons, and 8.31 and 14.4 tons, wherein not only is there a substantial lack of homogeneity between the comparative products, but also a substantial number of said products have crush points much lower than that provided by the cylinders of the same size of the present invention.

Tables 3–6 illustrate the lack of homogenity of performance of standard $Al_2O_3$ pellets having different amounts of $Al_2O_3$ and produced by different manufacturers.

Table 7 compares the break point testing of ceramic cylinders of a height of 14.5 mm according to the present invention, as compared with cylinders of the same height prepared by Rami Ceramics Israel. As can be seen, 25 cylinders of each type were tested, wherein the variation of break point of cylinders according to the present invention was between 8.9 and 10.1 tons, while the variation of break point of cylinders produced by Rami Ceramica varied between 1 and 9.5 tons.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A sintered, alumina ceramic product comprising about 90–93 w/w % $Al_2O_3$, about 0.5–1.0 w/w % MgO, up to about [<] 1.0 w/w % $SiO_2$, about 4.5–7.5 w/w % $ZrO_2$ and about 0.07–0.13 w/w % $HfO_2$.

2. A sintered, alumina ceramic product according to claim 1, comprising at least 0.585 w/w % MgO, 90 w/w % $Al_2O_3$, <0.05 w/w % $SiO_2$, 4.5 w/w % $ZrO_2$ and 0.075 w/w % $HfO_2$.

3. A sintered, alumina ceramic product according to claim 1, comprising at least 0.5 w/w % MgO, 90 w/w % $Al_2O_3$, 1 w/w % $SiO_2$, 7.5 w/w % $ZrO_2$ and 0.125 w/w % $HfO_2$.

4. A sintered, alumina ceramic product according to claim 1, comprising about 0.6 w/w % MgO, 93 w/w % $Al_2O_3$, <0.05 w/w % $SiO_2$, 6 w/w % $ZrO_2$ and 0.1 w/w % $HfO_2$.

5. A ceramic pellet for use in an armor panel, said pellet being made from a sintered, alumina product comprising about 90–93 w/w % $Al_2O_3$, about 0.5–1.0 w/w % MgO, about <1.0 w/w % $SiO_2$, about 4.5–7.5 w/w % $ZrO_2$ and about 0.07–0.13 w/w % $HfO_2$.

6. An armor panel comprising a single internal layer of high density ceramic pellets which are directly bound and retained in plate form by a solidified material such that the pellets are arranged in a single layer of adjacent rows and columns wherein a majority of each of said pellets is in direct contact with at least six adjacent pellets, wherein each of said pellets is made from a sintered, alumina product comprising about 90–93 w/w % $Al_2O_3$, about 0.5–1.0 w/w % MgO, up to about [<] 1.0 w/w % $SiO_2$, about 4.5–7.5 w/w % $ZrO_2$ and about 0.07–0.13 w/w % $HfO_2$ and there is less than a 30% difference between the crushing point of adjacent pellets.

7. A ceramic product according to claim 1, wherein the bulk resistivity of a plurality of products prepared from a single batch exhibits a standard deviation of less than 0.1.

* * * * *